Figure 1:
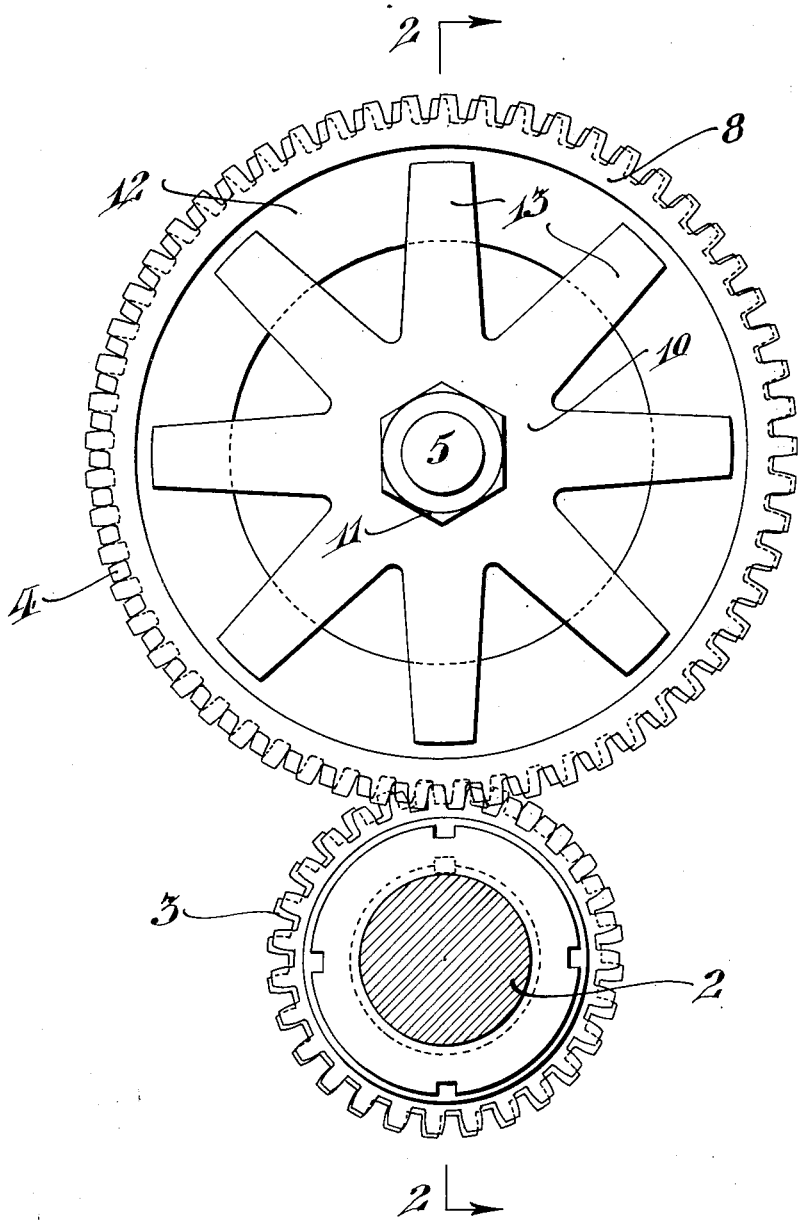

May 24, 1927.  1,629,564

J. M. WHITE

MEANS FOR PREVENTING BACKLASH IN GEARS

Filed Aug. 3, 1925      2 Sheets-Sheet 1

WITNESSES:

INVENTOR:
Jessee M. White,
BY
Joshua R. H. Potts
ATTORNEY

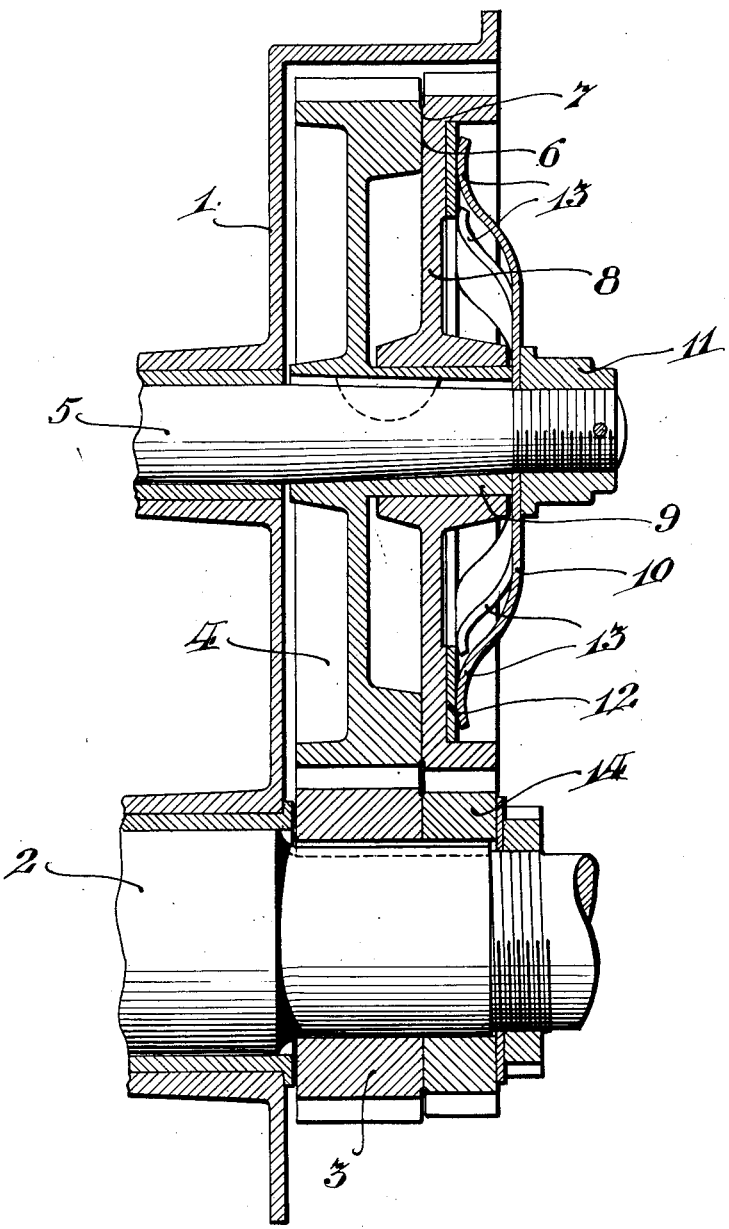

Patented May 24, 1927.

1,629,564

UNITED STATES PATENT OFFICE.

JESSEE MERCER WHITE, OF PHILADELPHIA, PENNSYLVANIA.

MEANS FOR PREVENTING BACKLASH IN GEARS.

Application filed August 3, 1925. Serial No. 47,763.

My invention relates to means for preventing back-lash in gears and is especially adapted for use with timing gears of automobile engines.

The automobile industry aims to produce an engine which runs smoothly and silently. To obtain this end, timing gears, which are most efficient for connecting the crank shaft to the cam shaft have been generally discarded because they produce an objectionable rattle.

The objects of my invention are to provide means for use with gears whereby metallic noise will be eliminated without sacrificing the clearance between the teeth and regardless of the amount of clearance produced by wear of the teeth.

These objects, and other advantageous ends which will be described hereinafter, I attain in the following manner, reference being had to the accompanying drawings in which Figure 1 is a face view of a pair of gears having my invention applied thereto, and Figure 2 a section on line 2—2 of Figure 1 showing a part of the engine casing.

Referring to the drawings, 1 indicates a casing, 2 a crank or driving shaft extending from the casing, 3 a driving gear keyed to the shaft, 4 a driven gear meshing with gear 3, and 5 a cam or driven shaft keyed to gear 4 and extending into the casing. Gear 4 has a face 6 which is slidably engaged by a face 7 of a friction gear 8 rotatably mounted on a hub extension 9 of gear 4. Friction gear 8 is held against face 6 of gear 4 by a spider spring 10 fastened on shaft 5 between hub extension 9 and a nut 11 on the end of the shaft. A wearing ring 12 is placed between fingers 13 of the spider spring 10 and the friction gear. Friction gear 8 is of greater diameter than gear 4 and meshes with a pinion 14 keyed to the driving shaft 2. Pinion 14 is of less diameter than the driving gear 3. Friction gear 8 being in engagement with gear 4 and rotating at a slower speed will offer resistance to rotation of gear 4. This action will always keep the teeth of gear 4 against the teeth of the driving gear 3 and thus prevent the back-lash and eliminate the humming noise caused by clearance between the teeth.

In operation, driving gear 3 will operate driven gear 4 and the shaft 5. Pinion 14 and friction gear 8 being of a different ratio from that of gears 3 and 4 will cause friction gear 8 to rotate at slower speed. Spring 10 keeping the face 7 of gear 8 in engagement with face 6 of gear 4, tends to retard the movement of gear 4 or offer resistance to its rotation. This action causes the driving teeth of gear 3 to bear against the front faces of the driven teeth of gear 4, and the teeth of gear 14 to bear against the rear faces of the teeth of friction gear and thus prevent vibration of the gears, due to clearance between their teeth.

I have shown the friction gear 8 as being rotatable relatively to driven gear 4 to produce resistance to its rotation, but this resistance may be produced by arranging the gears in other ways such as by fixing gear 8 to gear 4 and rotating gear 14 relatively to gear 3, or by connecting gear 14 with gear 8 through intermediate gears. It is immaterial how the gears are arranged to cause resistance to the movement of the driven gear so long as the frictional faces, such as 6 and 7, move at different speeds.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In combination with a driving shaft, having a driving gear thereon, and a driven shaft having a driven gear thereon; a friction gear mounted to rotate relatively to the driven shaft the friction gear and the driven gear having faces frictionally engaging each other; a pinion, fixed to the driving shaft and meshing with the friction gear, for rotating it at a different speed from that of the driven gear, a spider spring carried by the driven shaft and adapted to hold the friction gear in engagement with the driven gear, and a wearing ring between the spider and the friction gear.

2. In combination with a driving shaft having a driving gear thereon and a driven shaft; a driven gear keyed to the driven shaft and having a hub extension; a friction gear rotatable on the extension the friction gear and the driven gear having faces frictionally engaging each other; a pinion fixed to the driving gear and meshing with the friction gear for rotating it at a different speed from that of the driven gear; a wearing ring engaging the friction wheel and a spider spring carried by the driven shaft and having fingers engaging the wearing ring.

In testimony whereof I have signed my name to this specification.

JESSEE M. WHITE.